(12) United States Patent
Hopkins et al.

(10) Patent No.: US 12,508,494 B2
(45) Date of Patent: *Dec. 30, 2025

(54) MOUNTS FOR TRACKING DEVICES (71) Applicant: Elevation Lab, Inc., Portland, OR (US)

(72) Inventors: Casey Hopkins, Portland, OR (US); Jacob Hull, Portland, OR (US)

(73) Assignee: Elevation Lab, Inc., Portland, OR (US)

( * ) Notice: Subject to any disclaimer, the term of this patent is extended or adjusted under 35 U.S.C. 154(b) by 33 days.

This patent is subject to a terminal disclaimer.

(21) Appl. No.: 18/443,763

(22) Filed: Feb. 16, 2024

(65) Prior Publication Data
US 2025/0065215 A1 Feb. 27, 2025

Related U.S. Application Data (63) Continuation of application No. 18/452,924, filed on Aug. 21, 2023, now Pat. No. 11,931,643.

(51) Int. Cl.
*A63C 11/00* (2006.01)

(52) U.S. Cl.
CPC ........ *A63C 11/003* (2013.01); *A63C 2203/18* (2013.01)

(58) Field of Classification Search
CPC ... A63C 11/003; A63C 2203/18; G01S 15/60; G01S 7/027; G01S 5/02; G01S 3/043
USPC ............................. 340/539.13, 539.32, 572.1
See application file for complete search history.

(56) References Cited

U.S. PATENT DOCUMENTS

| | | | | |
|---|---|---|---|---|
| 647,383 | A * | 4/1900 | Eccleston et al. | F16K 15/12 297/DIG. 5 |
| 2,587,087 | A * | 2/1952 | Arnoux | G04B 37/11 368/286 |
| 3,177,724 | A * | 4/1965 | Trinca | B60C 23/0496 73/431 |
| 3,312,255 | A * | 4/1967 | Ellison | B65D 39/0094 222/215 |
| 3,608,685 | A * | 9/1971 | Childress | F16D 11/14 192/95 |
| 4,056,209 | A * | 11/1977 | Winkler | B65D 50/067 215/296 |
| 8,148,701 | B2 * | 4/2012 | Yoder | G01T 1/105 250/484.5 |
| D680,015 | S | 4/2013 | Hauser et al. | |
| 10,305,178 | B2 * | 5/2019 | Gibson | H01Q 1/38 |

(Continued)

FOREIGN PATENT DOCUMENTS

| CN | 103761553 A * 4/2014 |
|---|---|
| CN | 215219726 U * 12/2021 |

(Continued)

OTHER PUBLICATIONS

JP-H0544379-U English Translation (Year: 1993).*

(Continued)

*Primary Examiner* — Michael T. Walsh
(74) *Attorney, Agent, or Firm* — Kolitch Romano Dascenzo Gates LLC (57) ABSTRACT

Mounts (10) for securing a device (12) to an article (14) comprise a housing (16) having an internal volume (18) configured to selectively receive and retain the device (12) in the housing (16); and a coupler (20) attached to the housing (16) and configured to be operatively attached to the article (14).

23 Claims, 5 Drawing Sheets

(56) References Cited

U.S. PATENT DOCUMENTS

| | | | | |
|---|---|---|---|---|
| 11,160,335 | B2* | 11/2021 | Eidelman | A01K 27/009 |
| 11,224,301 | B2* | 1/2022 | Delgado Carmona | |
| | | | | B65D 53/02 |
| 2010/0147854 | A1* | 6/2010 | Fauveau | H02K 5/136 |
| | | | | 220/327 |
| 2012/0033898 | A1* | 2/2012 | Barron | B65D 47/242 |
| | | | | 220/288 |
| 2021/0274315 | A1* | 9/2021 | Daoura | H04W 4/38 |
| 2022/0391656 | A1 | 12/2022 | Chen et al. | |
| 2023/0032016 | A1* | 2/2023 | Welle | G01D 11/245 |
| 2023/0046992 | A1 | 2/2023 | Leyva et al. | |
| 2024/0100663 | A1* | 3/2024 | Chin | B25B 23/1427 |
| 2024/0211717 | A1 | 6/2024 | Barovic | |
| 2024/0239144 | A1 | 7/2024 | Trimnell | |
| 2024/0254809 | A1 | 8/2024 | Wright et al. | |
| 2024/0384872 | A1 | 11/2024 | Fraser | |

FOREIGN PATENT DOCUMENTS

| | | | | |
|---|---|---|---|---|
| DE | 3929468 C1 * | 3/1991 | | A63C 11/003 |
| JP | H0544379 U * | 6/1993 | | |
| JP | 2007233533 A * | 9/2007 | | |
| KR | 100999709 B1 * | 12/2010 | | G06K 17/0022 |
| WO | WO-2013117879 A1 * | 8/2013 | | G08B 21/24 |
| WO | WO-2014122239 A1 * | 8/2014 | | G06K 19/077 |

OTHER PUBLICATIONS

CN-215219726-U English Translation (Year: 2021).*
CN-103761553-A English Translation (Year: 2014).*
DE-3929468-C1 English Translation (Year: 1991).*
JP-2007233533-A English Translation (Year: 2007).*
KR-100999709-B1 English Translation (Year: 2010).*
WO-2013117879-A1 English Translation (Year: 2013).*
WO-2014122239-A1 English Translation (Year: 2014).*

* cited by examiner

MOUNTS FOR TRACKING DEVICES

RELATED APPLICATION

The present application is a continuation application that claims priority to U.S. patent application Ser. No. 18/452,924, which is entitled "MOUNTS FOR TRACKING DEVICES" and was filed on Aug. 21, 2023, the complete disclosure of which is hereby incorporated by reference.

FIELD

The present disclosure relates to mounts for tracking devices.

BACKGROUND

In recent years, wireless tracking devices have become popular amongst consumers. Typically, wireless tracking devices are small and require additional hardware to be physically mounted or coupled to an object that a user desires to track. Consumers often use wireless tracking devices for keys, sports equipment, pets, electronic equipment, etc. In some applications, such as sports equipment, when theft is a concern, it may not be possible to hide the wireless tracking device from sight. In addition, in some applications, such as skis and snowboards, a wireless tracking device may be vulnerable to being knocked off due to collisions or other inadvertent engagement of the wireless tracking device or housing for the wireless tracking device.

SUMMARY

Mounts for securing a device, such as a wireless tracking device, to an article are disclosed. The mounts comprise a housing and a coupler. The housing has an internal volume that is configured to selectively receive and retain the device in the housing. The coupler is attached to the housing and is configured to be operatively attached to the article. In some examples, the housing has a generally frustoconical shape. In some examples, the coupler defines a coupler aperture, and the housing extends into the coupler aperture. Some examples further comprise a hand tool that is specifically configured to mate with a cover of the housing for attachment and removal of the cover to and from a base of the housing.

DESCRIPTION

Mounts 10 for securing devices 12 to articles 14 are disclosed herein. Examples of devices 12 include wireless (e.g., WiFi, Bluetooth™, GPS) tracking devices (e.g., Apple AirTag™, Tile™, Samsung Galaxy SmartTag™, Chipolo One™, CubePro™, Orbiti™, and Baseus™ branded tracking devices); and examples of articles 14 include sports equipment, snowboards, skis, skateboards, surfboards, paddle boards, stand-up paddle boards, wakeboards, water skis, bicycles, hard-sided articles, land vehicles, trailers, All-Terrain-Vehicles (ATVs), motorcycles, watercraft, power tools, cases, luggage, camera gear, coolers, camping equipment, etc. Functionally, mounts 10 may be used to secure a tracking device to an article 14 that a user desires to keep track of. For example, in FIG. 1, two examples of mounts 10 are illustrated attached to a pair of skis.

Figure 2:
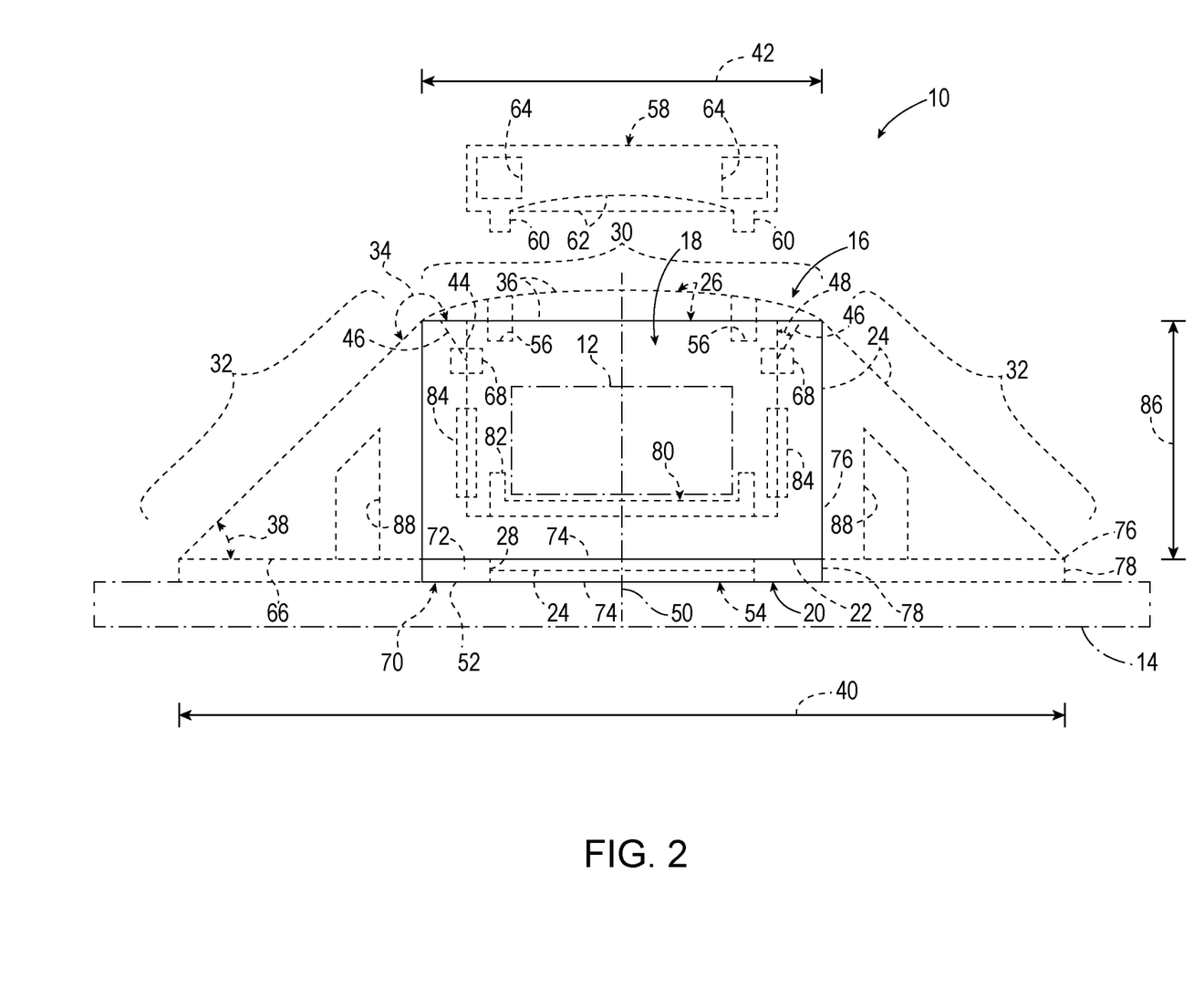
FIG. 2 is a schematic illustration representing mounts for tracking devices according to the present disclosure.

FIG. 2 schematically illustrates mounts 10 according to the present disclosure. Generally, in FIG. 2, elements that are likely to be included in a given example are illustrated in solid lines, while elements that are optional to a given example or correspond to a specific example are illustrated in broken lines. However, elements that are illustrated in solid lines are not essential to all examples of the present disclosure, and an element shown in solid lines may be omitted from a particular example without departing from the scope of the present disclosure.

As schematically illustrated in FIG. 2, mounts 10 generally comprise at least a housing 16 and a coupler 20 that is attached to the housing 16. The housing 16 has an internal volume 18 that is configured to selectively receive and retain a device 12, such as a tracking device, in the housing 16. The coupler 20 is configured to be operatively attached to an article 14.

In some examples, the coupler 20 is configured to be operatively attached to a planar surface of an article 14, such as a planar surface of sports equipment. However, this is not required in all examples, and the coupler 20 may be configured to be operatively attached to a non-planar surface, such as a curved, convex, concave, or irregular surface, including being configured to mate with a very specific surface of a particular article 14.

With continued reference to FIG. 2, in some examples, the coupler 20 may be described as comprising an attachment surface 52 opposite the housing 16, and the attachment surface 52 may be described as defining an attachment plane 54. In some such examples, the attachment surface 52 is planar, although this is not required, and the attachment surface 52 may be textured or otherwise non-planar, yet still define an attachment plane 54 for operative attachment to a planar, textured, or non-planar surface of an article 14.

The coupler 20 may take various forms, such that it is configured to operatively attach to a surface of an article 14. In some examples, the coupler 20 comprises an adhesive film 22, such as double-sided tape. In some examples, the coupler 20 comprises a double-sided foam tape 70, such as having a foam core 72 sandwiched between two layers of double-sided tape or adhesive 74. When present, the foam core 72 provides a flexible attachment of the mount 10 to an article 14, such that the foam core 72 will absorb impacts to the mount 10 and restrict inadvertent removal of the mount 10 from the article 14. In addition, the foam core 72 enables the mount 10 to be attached to non-smooth, rough, non-flat, and/or curved surfaces of an article 14, for example, with the foam core 72 enabling the lower double-sided tape or adhesive 74 to contour to the surface of the article 14. In some examples, the foam core 72 has a thickness in the range of 0.5-2 millimeters (mm); however, thicknesses outside of this range also may be used. A suitable example of a double-sided foam tape 70 that provides a strong attachment and restricts removal of a mount 10 from an article 14 is 3M™ VHB™ double-sided tape. Another suitable example of a coupler 20 is a magnet for operative attachment of the mount 10 to an article 14 having a magnetic (e.g., ferrous) surface, such as a vehicle. Mechanical fasteners (e.g., screws, bolts, and the like) also may be used as couplers 20, depending on the use case of a particular mount 10. The coupler 20 also may be or comprise an adhesive (e.g., glue) applied to the housing 16 or operative attachment to an article 14.

With continued reference to FIG. 2, the housing 16 may be described as having a housing outermost perimeter 76, and the coupler 20 may be described as having a coupler outermost perimeter 78. In some examples and as schematically represented in FIG. 2, the housing outermost perimeter 76 and the coupler outermost perimeter 78 are coextensive with each other. By "coextensive with each other," it is meant that the housing outermost perimeter 76 and the coupler outermost perimeter 78 are within less than 1 mm of each other. When such examples of mounts 10 are operatively attached to an article 14, no (or a very minimal) gap will be present between the housing 16 and the article 14, that otherwise could be used to pry the housing 16 away from the article 14 and thus detach the mount 10 from the article 14. That is, such mounts 10 may be described as being securely attached to an article 14 and thus more secure than competitive mounts that easily may be pried away from an article.

As schematically represented in FIG. 2, mounts 10 may define a central axis 50. In some examples, the mount 10 is substantially radially symmetrical about the central axis 50. For example, the mount 10 may have a generally circular profile. By "substantially radially symmetrical," it is meant that the mount 10 is at least 75% radially symmetrical, such as being at least 75% round. As a further example, a mount 10 need not be perfectly circular, and an ovular mount 10 or a mount 10 that is slightly out of round may be within the scope of being substantially radially symmetrical. In some examples, the profile of the mount 10 corresponds to a profile of a device 12. For example, a mount 10 configured to use with an Apple™ AirTag™ device may be generally circular, and a mount 10 configured for use with a Tile™ device may be generally rectangular with rounded corners.

With continued reference to FIG. 2, in some examples of mounts 10, the housing 16 defines a seat 80 within the internal volume 18 that is configured to mate with the device 12. As an example, the housing 16 may comprise a rib 82 that extends upward from a bottom of the internal volume 18 and that is configured to mate with the device 12. For example, the rib 82 may be circular and sized to receive a base of an Apple™ AirTag™ device. In some examples, the seat 80 is configured to mate with the device 12 in a friction-fit or snap-fit arrangement.

As schematically and optionally represented in FIG. 2, in some examples, the coupler 20 defines a coupler aperture 28, and the housing 16 extends into the coupler aperture 28. Such a configuration enables the overall height, or thickness, of the mount 10 to be reduced while still having an appropriate thickness of the housing 16 in the region of the coupler aperture 28, such as to ensure protection of a device 12 and/or to facilitate manufacturing (e.g., molding) of the housing 16. In some examples, when present, the coupler aperture may be centered about the central axis 50 of the mount 10. In some examples, the housing 16 does not extend fully through the coupler aperture 28. In such a configuration, such as when a double-sided foam tape 70 is utilized as the coupler 20, the portion of the housing 16 extending into the coupler aperture 28 will not overly restrict compression of the foam core 72 when the mount 10 is being attached to an article 14.

Figure 1:
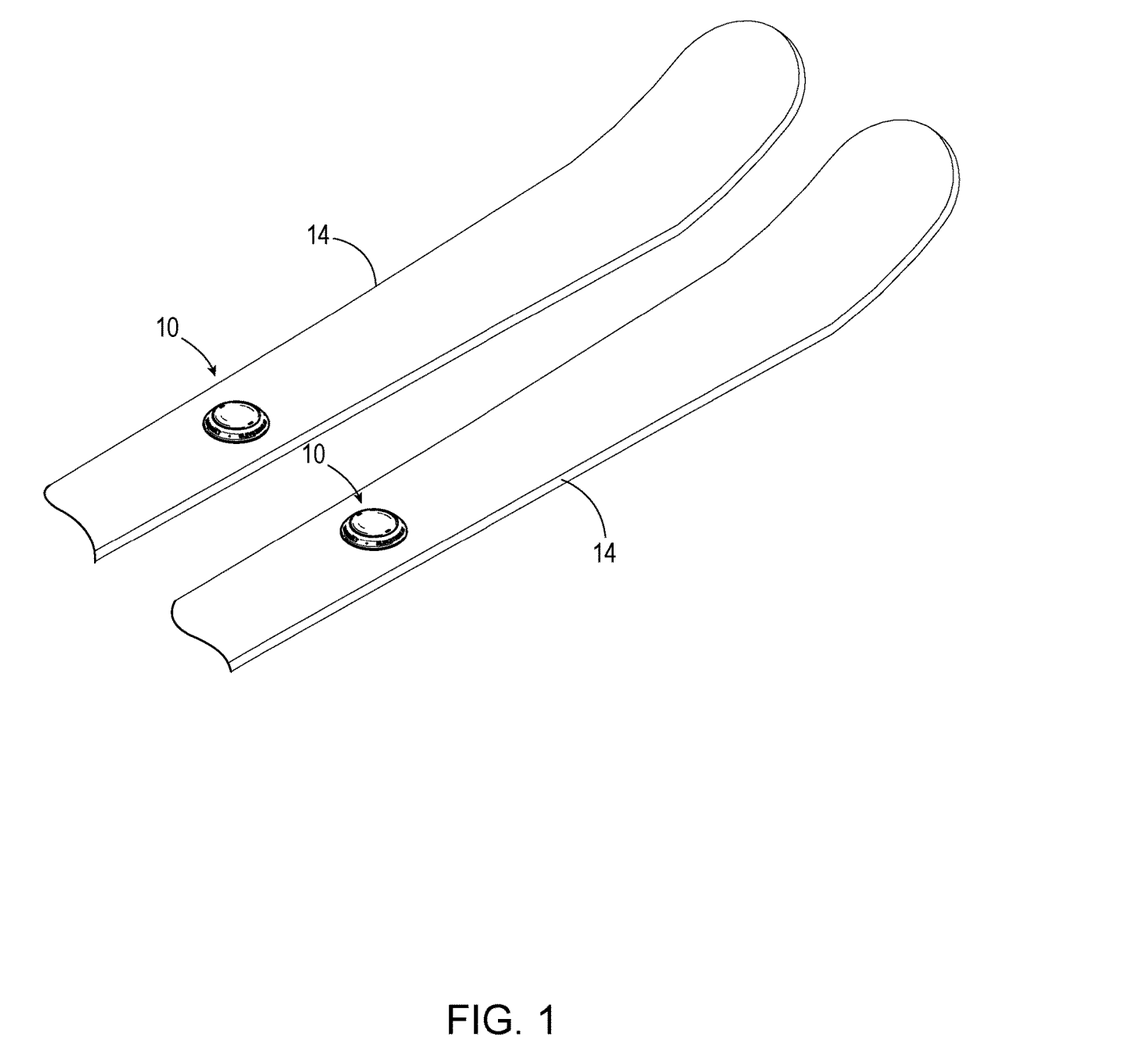
FIG. 1 illustrates an example use case for mounts according to the present disclosure.

As schematically and optionally represented in FIG. 2, in some examples of mounts 10, the housing 16 has a generally frustoconical shape and/or is at least substantially frustoconical. By "generally frustoconical" and "at least substantially frustoconical," it is meant that the housing 16 is not necessarily perfectly frustoconical. For example, an outer surface of the housing 16 may be slightly concave or convex. Additionally or alternatively, in some examples, the housing 16 may be described as having ramped and/or sloped sides. Such configurations of housings 16 serve to restrict inadvertent removal of the mount 10 from an article 14. As an example, when a mount 10 is operatively attached to a top surface of a ski, such as illustrated in FIG. 1, having ramped or sloped sides will restrict another ski or object from catching on the side of the mount 10 and inadvertently knocking the mount 10 off of the ski.

With continued reference to FIG. 2, in some examples, the housing 16 may be described as comprising an upper surface 36 that is opposite the coupler 20 and that has a central region 30 and a peripheral region 32 that extends around the central region 30. In some such examples, the central region 30 is at least substantially flat, and the peripheral region 32 slopes away from the central region 30. By "substantially flat," it is meant that the central region 30 need not be planar but also may be slightly convex or concave, such that the tangent planes of the central region are within 10 degrees or less of parallel to each other. By having a substantially flat central region 30 and by having a peripheral region 32 that slopes away from the central region 30, the mount 10, when operatively attached to an article 14, is not easily grasped by a person's hand or a tool, such as pliers, to be removed from the article 14.

In some such examples, at least a substantial portion of the peripheral region 32 extends at an angle 34 of 200-235 degrees or 220-230 degrees relative to the central region 30. Additionally or alternatively, in some examples, at least a substantial portion of the peripheral region 32 extends at an angle 38 of 10-55 degrees or 35-50 degrees relative to the attachment plane 54 defined by the coupler 20. By "at least a substantial portion," it is meant that within at least 75% of the peripheral region 32, all planes tangent with the peripheral region 32 are within the designated angle range relative to the referenced element (e.g., the central region 30 or the attachment plane 54). When the reference element itself is not planar, such as if the central region 30 is convex, it is meant that all planes tangent with the peripheral region 32 are within the designated angle range relative to all planes tangent with the referenced element (e.g., the central region 30).

In some examples, as schematically represented in FIG. 2, the housing 16 may be described as having a housing diameter 40 (or outermost dimension), and the central region 30 may be described as having a central-region diameter 42 (or outermost dimension) that is 60-90% or 70-80% of the housing diameter 40. Stated differently, the central region 30 may account for 60-90% or 70-80% of the overall width of the housing 16. Some housings 16 have a housing diameter 40 in the range of 40-60 mm, such as 50 mm.

As also schematically represented in FIG. 2, the housing 16 may be described as having a housing height 86 (or thickness). In some examples of mounts 10, the housing diameter 40 is at least 2, at least 4, at least 5, 2-6, 2-5, 3-6, 4-6, or 3-5 times the housing height 86. The housing height 86 may be in the range of 8-13 mm, such as about 10-11 mm. Accordingly, such mounts 10 may be described as low profile, particularly when the housing 16 has a generally frustoconical shape. Such examples of mounts 10 will not stand out when applied to articles 14, such as skis or snowboards, and thus a thief may be less likely to notice the presence of the mount 10 and thus, of the tracking device 12 coupled to the article 14. As a result, the rightful owner of the article 14 may be able to track the article 14 prior to removal of the tracking device from the article 14.

With continued reference to FIG. 2, in some examples of mounts 10, the housing 16 comprises a base 24 that is attached to the coupler 20, and a cover 26 that is removably coupled to the base 24 to permit placement and removal of a device 12 in and from the internal volume 18. That is, the cover 26 is configured to selectively retain a device 12 within the internal volume 18 of the housing 16 or to otherwise at least temporarily restrict removal of a device 12 from the internal volume 18 of the housing 16. In some such examples, the cover 26 is threadingly coupled to the base 24, such as with a pair of mating threads 84, as schematically and optionally represented in FIG. 2. In other examples, the cover 26 may have a friction-fit, a snap-fit, or another arrangement with the base 24.

In some examples, the base 24 defines an opening 44, and the cover 26 extends through the opening 44 when the cover 26 is operatively coupled to the base 24. Such a cover 26 may be described as a plug-style cover, since it extends into the base 24 as opposed to extending external to the base 24. In such examples in which the cover 26 is threadingly coupled to the base 24, the cover 26 comprises an external thread, and the base 24 comprises an internal thread. By including a plug-style cover 26, when the cover 26 is operatively coupled to the base 24, an edge of the cover 26 will not be accessible for a person to attempt to pry the cover 26 away from the base 24. Additionally, an interface of the central region 30 and the peripheral region 32 of the housing 16 may be substantially smooth, so that there are no edges that can be grasped for removal of the cover 26 by an unauthorized person or that may inadvertently catch a structure (e.g., an adjacent ski) coming into contact with the mount 10.

As schematically indicated in FIG. 2, in some examples, an interface 46 between the cover 26 and the base 24 at the opening 44 to the base 24 is skew relative to the central axis 50 of the mount 10. In particular, in some such examples, the interface 46 has an interface angle 48 of 1-15 degrees radially outward relative to the central axis 50. Accordingly, when the cover 26 is operatively coupled to the base 24, the cover 26 will wedge against the base 24, resulting in a tight and secure fit between the cover 26 and the base 24. As a result, there will be no to little gap between the cover 26 and the base 24, into which a person could extend a tool in an effort to pry the cover 26 away from the base 24. In some such examples, as represented in FIG. 2, the housing 16 further comprises a gasket 68 that is operatively positioned at the interface 46, such that the gasket 68 is compressed when the cover 26 is operatively coupled to the base 24. Accordingly, such examples may be described as being waterproof and protecting a device 12 housed within the internal volume 18 from liquids and dust. In some examples, the gasket 68 is molded onto the cover 26. In other examples, the gasket 68 is an O-ring or a D-ring.

In some examples and as schematically indicated in FIG. 2, the cover 26 may be described as defining at least the central region 30 of the upper surface 36 of the housing 16, and the base 24 may at least substantially define the peripheral region 32 of the upper surface 36 of the housing 16. By "at least substantially define," it is meant that the base may define at least 75% of the peripheral region 32 of the upper surface 36 of the housing 16.

As schematically represented in FIG. 2, the cover 26 of some mounts 10 defines a pair of spaced-apart cover cavities 56 that extend into the upper surface 36 of the cover 26 and that are evenly spaced from the central axis 50 of the mount 10. Accordingly, a hand tool 58, which may be described as a spanner wrench, may be provided to interface, or mate, with the cover cavities 56 to permit operative removal of the cover 26 from the base 24, such as in examples where the cover 26 is threadingly coupled to the base 24. More specifically, and as schematically illustrated in FIG. 2, the hand tool 58 comprises a pair of spaced-apart protrusions 60 that are sized and shaped to mate with the pair of spaced-apart cover cavities 56 of the cover 26. As also schematically represented in FIG. 2, in some examples, the hand tool 58 may be described as having a cover engagement surface 62 that is configured to engage and mate with the upper surface 36 of the cover 26 when the pair of spaced-apart protrusions 60 mate with the pair of spaced-apart cover cavities 56. For example, the upper surface 36 of the cover 26 may be convex, and the engagement surface 62 of the hand tool 58 may be correspondingly concave with an identical curvature. In some examples, the spaced-apart cover cavities 56 have dimensions that restrict insertion of off-the-shelf tools, such as needle nose pliers. In some examples, such dimensions are less than 3 mm. In some examples, the spaced-apart cover cavities 56 and the corresponding spaced-apart protrusions 60 do not have a circular profile. For examples, the spaced-apart cover cavities 56 and the corresponding spaced-apart protrusions 60 may have ovular or curved ovular profiles. Accordingly, mounts 10 with one or more of these features restrict any tool but the provided hand tool 58 to operatively mate with the cover 26 for removal of the cover 26 from the base 24, thereby preventing an unauthorized person from easily removing the cover 26 from the base 24 and removing a device 12 housed within the housing 16.

As illustrated in FIG. 2, some hand tools 58 define at least one hand-tool aperture 64, such as may be used for attachment to a key ring, a carabiner, a lanyard, or another structure to enable a user to keep track of and not easily lose the hand tool 58.

With continued reference to FIG. 2, the base 24 may be described as having a lower surface 66, to which the coupler 20 is attached, and in some examples of mounts 10, the base 24 defines a plurality of spaced-apart base cavities 88 extending into the base 24 from the lower surface 66. In some such examples, the plurality of spaced-apart base cavities 88 are spaced radially around the central axis 50 of the mount 10. When present, not only do the base cavities 88 result in a lighter weight mount 10, but also serve as a spin lock during manufacturing of the housing 16. More specifically, when the inner tool (i.e., inner mold) that forms the internal threads on base 24 of the housing 16 is unscrewed from the base 24, the outer tool (i.e., outer mold) that forms the outer surface of the base 24 will prevent the base 24 from rotating with the inner tool.

Figure 3:
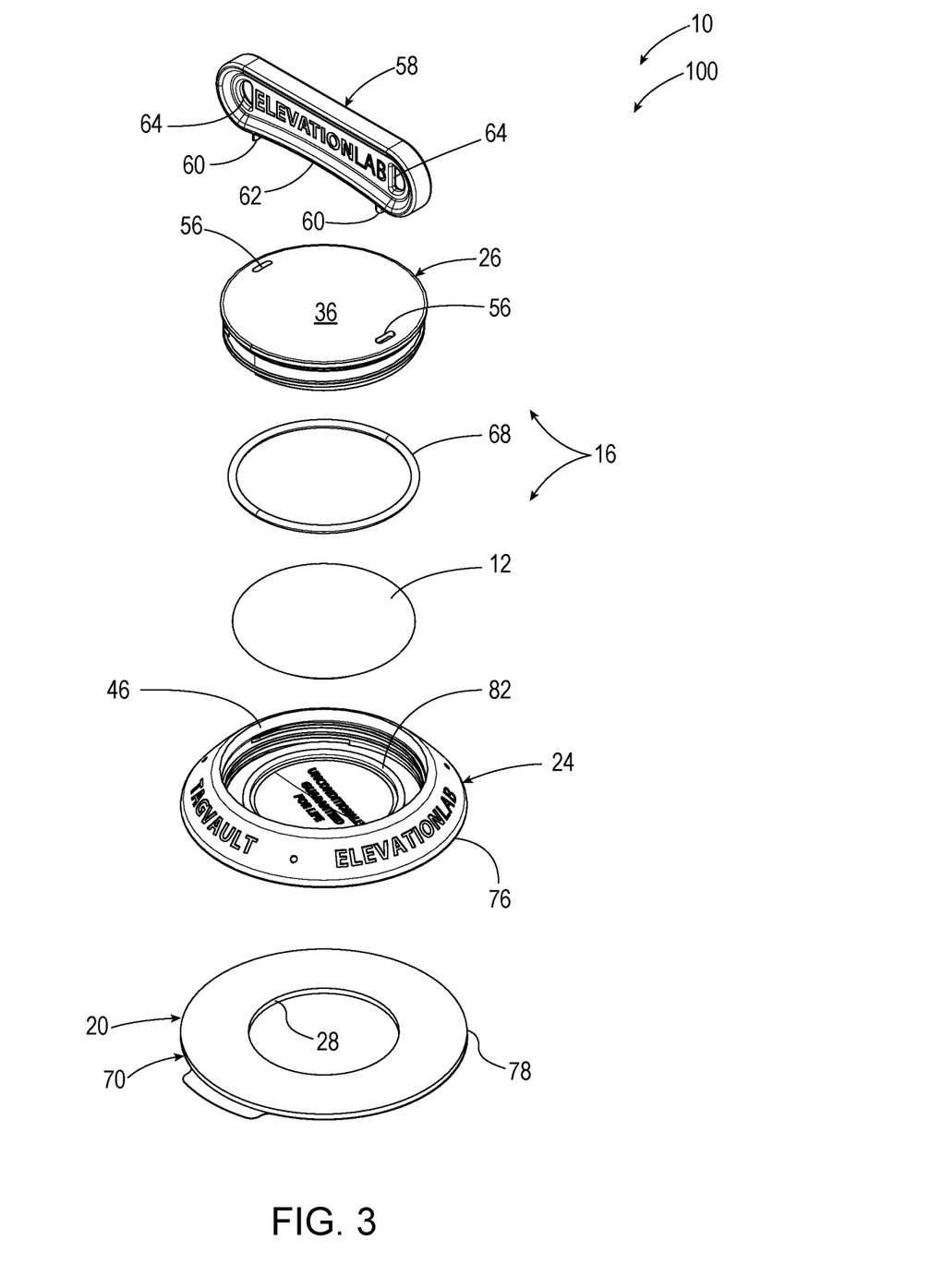
FIG. 3 is an exploded isometric view of an example mount according to the present disclosure, shown with an Apple™ AirTag™ device for placement within the mount.
Figure 4:
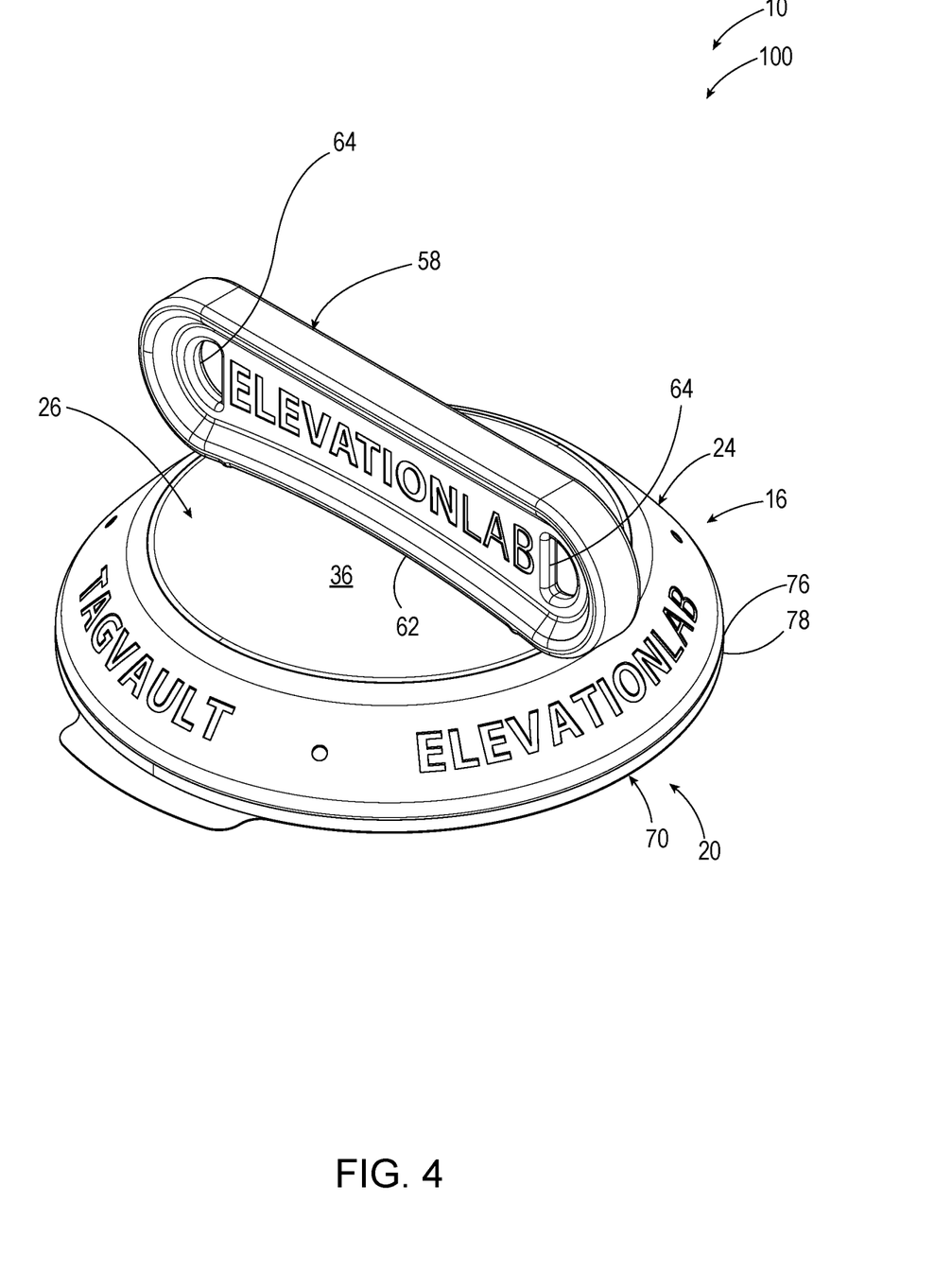
FIG. 4 is an isometric view of the mount of FIG. 3.
Figure 5:
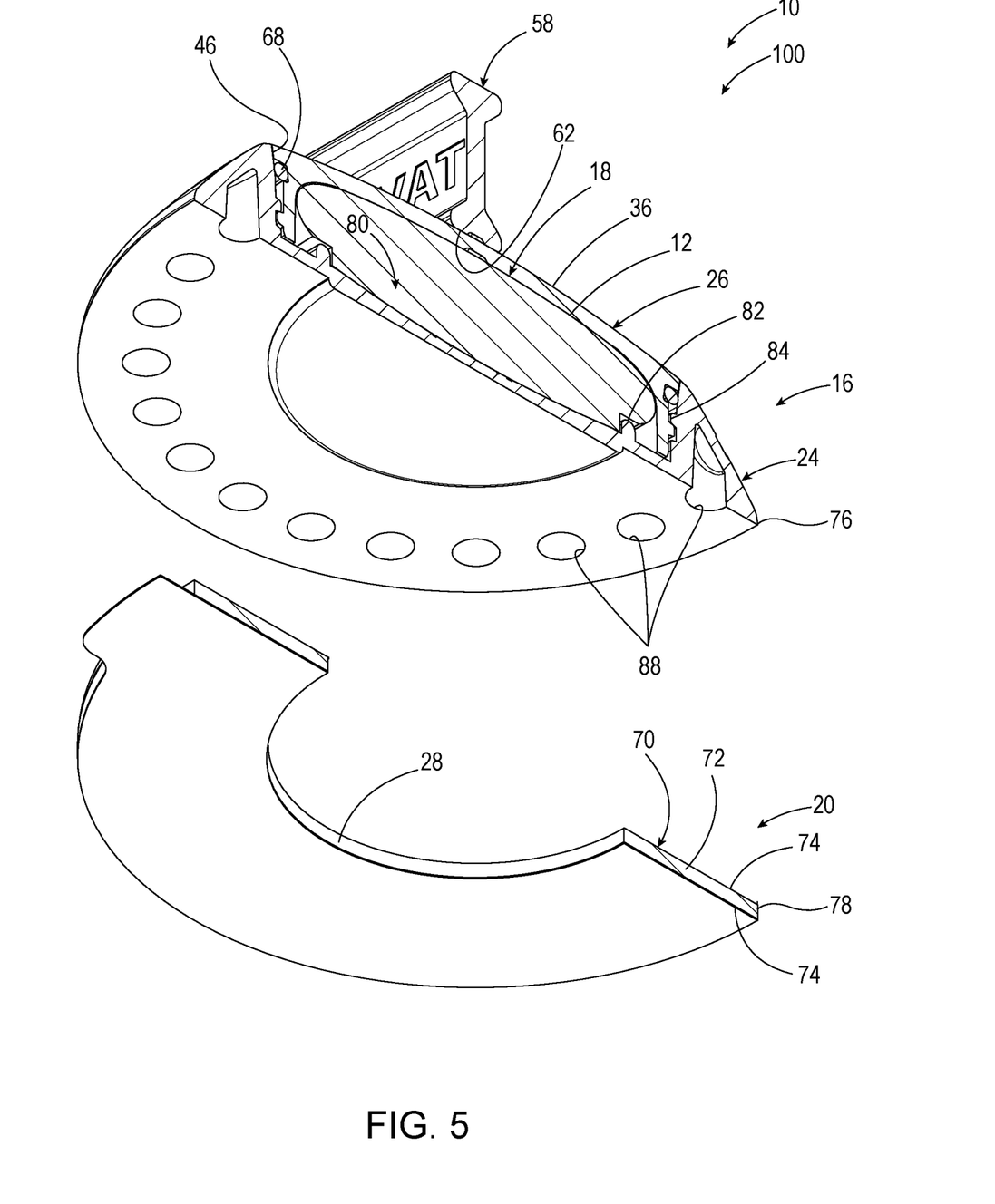
FIG. 5 is an exploded cross-sectional isometric bottom view of the mount of FIG. 3.

Turning now to FIGS. 3-5, an illustrative non-exclusive example of a mount 10 in the form of a mount 100 is illustrated. Where appropriate, the reference numerals from the schematic illustration of FIG. 2 are used to designate corresponding parts of the mount 100; however, the example of FIGS. 3-5 is non-exclusive and does not limit mounts 10 to the illustrated embodiment of mount 100. That is, mounts 10 are not limited to the specific embodiment of the illustrated mount 100, and mounts 10 may incorporate any number of the various aspects, configurations, characteristics, properties, etc. of mounts 10 that are illustrated in and discussed with reference to the schematic representation of FIG. 2 and/or the embodiment of FIGS. 3-5, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the mount 100; however, it is within the scope of the present disclosure that the previously discussed features, variants, etc. may be utilized with the mount 100.

As seen in FIGS. 3-5, mount 100 is an example of a mount 10 that includes a base 24 and a plug-style cover 26 that is threadingly coupled to the base 24 and whose housing 16 is generally frustoconical. The coupler 20 of mount 100 is in the form of a double-sided foam tape 70, whose coupler outermost perimeter 78 is coextensive with the housing outermost perimeter 76. As best seen in the cross-sectional view of FIG. 5, the double-sided foam tape 70 defines a coupler aperture 28, and the base 24 of the housing 16 extends partially into the coupler aperture 28. Accordingly, with these various features of mounts 10, mount 100 may be described as a low profile mount 10 that is well suited to restrict inadvertent or purposeful removal of the mount 100 when operatively attached to an article 14. As also seen in FIG. 5, the interface 46 between the cover 26 and the base 24 is skew relative to the central axis 50, and a gasket 68 is operatively positioned at the interface 46. Accordingly, mount 100 is an example of a mount 10 that may be described as being waterproof.

Mount 100 is an example of a mount 10 that comprises a hand tool 58 with protrusions 60 that mate with corresponding cover cavities 56 and whose cover engagement surface 62 is shaped to mate with a convex upper surface 36 of the cover 26. As a result, mount 100 is an example of a mount 10 that is configured to restrict unauthorized removal of the cover 26 from the base 24, that is, by a person that does not possess the hand tool 58. Mount 100 therefore may be well suited for use with articles 14 whose owners are concerned with theft, so that an unauthorized person cannot easily remove the cover 26 from the base 24 and thus, the device 12 from the mount 100.

Illustrative, non-exclusive examples of inventive subject matter according to the present disclosure are described in the following enumerated paragraphs:

A. A mount (10) for securing a device (12) to an article (14), the mount (10) comprising:
a housing (16) having an internal volume (18) configured to selectively receive and retain the device (12) in the housing (16); and
a coupler (20) attached to the housing (16) and configured to be operatively attached to the article (14).

A1. The mount (10) of paragraph A, wherein the coupler (20) is configured to be operatively attached to a planar surface of the article (14).

A2. The mount (10) of any of paragraphs A-A1, wherein the coupler (20) comprises an attachment surface (52) opposite the housing (16), and wherein the attachment surface (52) defines an attachment plane (54).

A3. The mount (10) of any of paragraphs A-A2, wherein the coupler (20) comprises an adhesive film (22).

A4. The mount (10) of any of paragraphs A-A3, wherein the coupler (20) comprises a double-sided foam tape (70).

A5. The mount (10) of any of paragraphs A-A4, wherein the mount (10) defines a central axis (50), and wherein the mount (10) is substantially radially symmetrical about the central axis (50).

A6. The mount (10) of any of paragraphs A-A5, wherein the housing (16) defines a seat (80) within the internal volume (18), and wherein the seat (80) is configured to mate with the device (12).

A7. The mount (10) of any of paragraphs A-A6, wherein the housing (16) comprises a rib (82) extending upward from a bottom of the internal volume (18), and wherein the rib (82) is configured to mate with the device (12).

A7.1. The mount (10) of paragraph A7, wherein the rib (82) is circular.

A8. The mount (10) of any of paragraphs A-A7.1, wherein the coupler (20) defines a coupler aperture (28), and wherein the housing (16) extends into the coupler aperture (28).

A8.1. The mount (10) of paragraph A8, wherein the housing (16) does not extend fully through the coupler aperture (28).

A9. The mount (10) of any of paragraphs A-A8.1, wherein the housing (16) has a generally frustoconical shape and/or is at least substantially frustoconical.

A10. The mount (10) of any of paragraphs A-A9, wherein the housing (16) comprises an upper surface (36) opposite the coupler (20), wherein the upper surface (36) has a central region (30) and a peripheral region (32) extending around the central region (30), wherein the central region (30) is at least substantially flat, and wherein the peripheral region (32) slopes away from the central region (30).

A10.1. The mount (10) of paragraph A10, wherein at least a substantial portion of the peripheral region (32) extends at an angle (34) of 200-235 degrees or 220-230 degrees relative to the central region (30).

A10.2. The mount (10) of any of paragraphs A10-A10.1 when depending from paragraph A2, wherein at least a/the substantial portion of the peripheral region (32) extends at an angle (38) of 10-55 degrees or 35-50 degrees relative to the attachment plane (54).

A10.3. The mount (10) of any of paragraphs A10-A10.2, wherein the housing (16) has a housing diameter (40), and wherein the central region (30) has a central-region diameter (42) that is 60-90% or 70-80% of the housing diameter (40).

A10.4. The mount (10) of any of paragraphs A10-A10.3, wherein the housing (16) has a/the housing diameter (40) and a housing height (86), and wherein the housing diameter (40) is at least 2, at least 4, at least 5, 2-6, 2-5, 3-6, 4-6, or 3-5 times the housing height (86).

A11. The mount (10) of any of paragraphs A-A10.4, wherein the housing (16) comprises:
a base (24), wherein the coupler (20) is attached to the base (24); and
a cover (26) removably coupled to the base (24) to permit placement and removal of the device (12) in and from the internal volume (18).

A11.1. The mount (10) of paragraph A11, wherein the cover (26) is threadingly coupled to the base (24).

A11.2. The mount (10) of any of paragraphs A11-A11.1, wherein the base (24) defines an opening (44), and wherein the cover (26) extends through the opening (44) when the cover (26) is operatively coupled to the base (24).

A11.2.1. The mount (10) of paragraph A11.2, wherein an interface (46) between the cover (26) and the base (24) at the opening (44) is skew relative to a/the central axis (50) of the mount (10).

A11.2.1.1. The mount (10) of paragraph A11.2.1, wherein the interface (46) has an interface angle (48) of 1-15 degrees radially outward relative to the central axis (50).

A11.2.1.2. The mount (10) of any of paragraphs A11.2.1-A11.2.1.1, wherein the housing (16) further comprises a gasket (68) operatively positioned at the interface (46).

A11.3. The mount (10) of any of paragraphs A11-A11.2.1.2 when depending from paragraph A10, wherein the cover (26) defines at least the central region (30) of the upper surface (36) of the housing (16), and wherein the base (24) at least substantially defines the peripheral region (32) of the upper surface (36) of the housing (16).

A11.4. The mount (10) of any of paragraphs A11-A11.3, wherein the cover (26) defines a pair of spaced-apart cover cavities (56) extending into an/the upper surface (36) of the cover (26), wherein the pair of spaced-apart cover cavities (56) are evenly spaced from a/the central axis (50) of the mount (10).

A11.4.1. The mount (10) of paragraph A11.4, wherein the upper surface (36) of the cover (26) is convex.

A11.4.2. The mount (10) of any of paragraphs A11.4-A11.4.1, further comprising a hand tool (58), wherein the hand tool (58) comprises a pair of spaced-apart protrusions (60) that are sized and shaped to mate with the pair of spaced-apart cover cavities (56) of the cover (26).

A11.4.2.1. The mount (10) of paragraph A11.4.2, wherein the hand tool (58) has a cover engagement surface (62) that is configured to engage and mate with the upper surface (36) of the cover (26) when the pair of spaced-apart protrusions (60) mate with the pair of spaced-apart cover cavities (56).

A11.4.2.2. The mount (10) of any of paragraphs A11.4.2-A11.4.2.1, wherein the hand tool (58) defines at least one hand-tool aperture (64).

A11.5. The mount (10) of any of paragraphs A11-A11.4.2.2, wherein the base (24) has a lower surface (66) to which the coupler (20) is attached, and wherein the base (24) defines a plurality of spaced-apart base cavities (88) extending into the base (24) from the lower surface (66), and wherein the plurality of spaced-apart base cavities (88) are spaced radially around a/the central axis (50) of the mount (10).

A12. The mount (10) of any of paragraphs A-A11.5, wherein the housing (16) has a housing outermost perimeter (76), wherein the coupler (20) has a coupler outermost perimeter (78), and wherein the housing outermost perimeter (76) and the coupler outermost perimeter (78) are coextensive with each other.

A13. The mount (10) of any of paragraphs A-A12, further comprising the device (12).

A13.1. The mount (10) of paragraph A13, wherein the device (12) is operatively received within the internal volume (18).

A14. The mount (10) of any of paragraphs A-A13.1, wherein the device (12) is a tracking device, optionally an Apple™ AirTag™ device.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A mount (10) for securing a stand-alone tracking device (12) to an article (14), the mount (10) comprising:
    a housing (16) having a generally frustoconical shape with a circular profile, wherein the housing (16) comprises a base (24) and a cover (26), wherein the base (24) and the cover (26) collectively define an internal volume (18) within the housing (16) when the cover (26) is operatively coupled to the base (24), wherein the internal volume (18) is configured to selectively receive and retain the stand-alone tracking device (12) in the housing (16), and wherein the cover (26) is removably coupled to the base (24) to permit placement and removal of the stand-alone tracking device (12) in and from the internal volume (18); and
    a coupler (20) attached to the base (24) of the housing (16) and configured to be operatively attached to the article (14).

2. The mount (10) of claim 1, wherein the coupler (20) comprises a double-sided foam tape (70).

3. The mount (10) of claim 1, wherein the coupler (20) defines a coupler aperture (28), and wherein the housing (16) extends into the coupler aperture (28).

4. The mount (10) of claim 3, wherein the housing (16) does not extend fully through the coupler aperture (28).

5. The mount (10) of claim 1, wherein the housing (16) comprises an upper surface (36) opposite the coupler (20), wherein the upper surface (36) has a central region (30) and a peripheral region (32) extending around the central region (30), wherein the central region (30) is at least substantially flat, wherein the peripheral region (32) slopes away from the central region (30), and wherein at least a substantial portion of the peripheral region (32) extends at an angle (34) of 200-235 degrees relative to the central region (30).

6. The mount (10) of claim 5, wherein the housing (16) has a housing diameter (40), and wherein the central region (30) has a central-region diameter (42) that is 60-90% of the housing diameter (40).

7. The mount (10) of claim 5, wherein the housing (16) has a housing diameter (40) and a housing height (86), and wherein the housing diameter (40) is 4-6 times the housing height (86).

8. The mount (10) of claim 5, wherein the housing (16) has a housing diameter (40), and wherein the central region (30) has a central-region diameter (42) that is 70-80% of the housing diameter (40).

9. The mount (10) of claim 1, wherein the cover (26) is threadingly coupled to the base (24), wherein the base (24) defines an opening (44), and wherein the cover (26) extends through the opening (44) when the cover (26) is operatively coupled to the base (24).

10. The mount (10) of claim 9, wherein an interface (46) between the cover (26) and the base (24) at the opening (44) is skew relative to a central axis (50) of the mount (10).

11. The mount (10) of claim 10, wherein the housing (16) further comprises a gasket (68) operatively positioned at the interface (46).

12. The mount (10) of claim 1, wherein the cover (26) defines a pair of spaced-apart cover cavities (56) extending into an upper surface (36) of the cover (26), and wherein the pair of spaced-apart cover cavities (56) are evenly spaced from a central axis (50) of the mount (10).

13. The mount (10) of claim 12, further comprising a hand tool (58), wherein the hand tool (58) comprises a pair of spaced-apart protrusions (60) that are sized and shaped to mate with the pair of spaced-apart cover cavities (56) of the cover (26).

14. The mount (10) of claim 13, wherein the hand tool (58) has a cover engagement surface (62) that is configured to engage and mate with the upper surface (36) of the cover (26) when the pair of spaced-apart protrusions (60) mate with the pair of spaced-apart cover cavities (56).

15. The mount (10) of claim 14, wherein the upper surface (36) of the cover (26) is convex, and wherein the cover engagement surface (62) of the hand tool (58) is correspondingly concave.

16. The mount (10) of claim 13, wherein the hand tool (58) defines at least one hand-tool aperture (64).

17. The mount (10) of claim 12, wherein the pair of spaced-apart cover cavities (56) are non-circular.

18. The mount (10) of claim 1, wherein the base (24) has a lower surface (66) to which the coupler (20) is attached, and wherein the base (24) defines a plurality of spaced-apart base cavities (88) extending into the base (24) from the lower surface (66), and wherein the plurality of spaced-apart base cavities (88) are spaced radially around a central axis (50) of the mount (10).

19. The mount (10) of claim 1, further comprising the stand-alone tracking device (12).

20. The mount (10) of claim 1, wherein the coupler (20) comprises a double-sided foam tape (70), wherein the double-sided foam tape (70) defines a coupler aperture (28), wherein the housing (16) extends into the coupler aperture (28), and wherein the housing (16) does not extend fully through the coupler aperture (28).

21. The mount (10) of claim 1, wherein the internal volume (18) has a circular profile.

22. A mount (10) for securing a stand-alone tracking device (12) to an article (14), the mount (10) comprising:
   a housing (16) having an internal volume (18) configured to selectively receive and retain the stand-alone tracking device (12) in the housing (16), wherein the housing (16) comprises:
      a base (24) comprising an internal thread, wherein the base (24) defines an opening (44); and
      a cover (26) removably coupled to the base (24) and comprising an external thread threadingly coupled to the internal thread of the base (24) to permit placement and removal of the stand-alone tracking device (12) in and from the internal volume (18), wherein the cover (26) extends through the opening (44) when the cover (26) is operatively coupled to the base (24), wherein the cover (26) comprises an upper surface (36) that is convex, wherein the cover (26) defines a non-circular cavity (56) extending into the upper surface (36);
   a coupler (20) attached to the base (24) of the housing (16) and configured to be operatively attached to the article (14); and
   a hand tool (58), wherein the hand tool (58) is sized and shaped to mate with the non-circular cavity (56) of the cover (26) for operative removal and replacement of the cover (26) from and to the base (24).

23. The mount (10) of claim 22, wherein the hand tool (58) defines at least one hand-tool aperture (64).

\* \* \* \* \*